(12) United States Patent
Senior (10) Patent No.: US 8,413,451 B2
(45) Date of Patent: Apr. 9, 2013

(54) TURBINE WITH FLUIDICALLY-CONTROLLED VALVE AND SWIRLER WITH A BLEED HOLE

(75) Inventor: Peter Senior, Levittown, PA (US)

(73) Assignee: Siemens Aktiengesellschaft, München (DE)

( * ) Notice: Subject to any disclaimer, the term of this patent is extended or adjusted under 35 U.S.C. 154(b) by 938 days.

(21) Appl. No.: 12/502,574

(22) Filed: Jul. 14, 2009

(65) Prior Publication Data
US 2010/0011779 A1   Jan. 21, 2010

(30) Foreign Application Priority Data
Jul. 16, 2008  (EP) .................................... 08012847

(51) Int. Cl.
*F02C 6/04*      (2006.01)
(52) U.S. Cl.
USPC .............................................. 60/785; 60/748
(58) Field of Classification Search .................... 60/262, 60/748, 782, 785, 806; 239/399, 407–411
See application file for complete search history.

(56) References Cited

U.S. PATENT DOCUMENTS

| 3,047,208 A | | 7/1962 | Coanda | |
|---|---|---|---|---|
| 4,448,354 A | * | 5/1984 | Reznick et al. | 239/265.17 |
| 6,182,440 B1 | * | 2/2001 | Bilenas et al. | 60/39.5 |
| 6,550,253 B2 | * | 4/2003 | Mortzheim et al. | 60/782 |
| 2005/0210882 A1 | | 9/2005 | Winstanley | |
| 2008/0057848 A1 | | 3/2008 | Gray et al. | |
| 2012/0117977 A1 | * | 5/2012 | Childers et al. | 60/782 |

FOREIGN PATENT DOCUMENTS

| DE | 971025 C | 11/1958 |
|---|---|---|
| SE | 9801821 | 11/1999 |
| SE | 9801831 | 11/1999 |

OTHER PUBLICATIONS

Allen et al., "Axisymmetric Coanda-Assisted Vectoring", Experiements in Fluids; Experimental Methods and Their Applications to Fluid Flow, 2008, pp. 55-64, XP019656216, vol. 46, No. 1,Springer, Berlin, DE.

* cited by examiner

*Primary Examiner* — Phutthiwat Wongwian (57) ABSTRACT

A fluidically-controlled valve is provided. The fluidically-controlled valve includes a main flow channel with a main flow entrance, a flow exit and a constricted channel section located between the main flow entrance and the flow exit. The fluidically-controlled valve also includes a control flow channel including a jet forming control entrance, a first branch channel, a second branch channel, a common channel section, and a convex channel wall. The common channel section follows the control entrance, the first branch channel emerges from the common channel section and leads to the main flow entrance, the second branch channel emerges from the common channel section and leads to the constricted channel section, and the convex channel wall extends from the common channel section into the first branch channel. The fluidically-controlled valve can be used in bypasses present in turbines or in swirlers of gas turbine combustors.

17 Claims, 8 Drawing Sheets

TURBINE WITH FLUIDICALLY-CONTROLLED VALVE AND SWIRLER WITH A BLEED HOLE

CROSS REFERENCE TO RELATED APPLICATIONS

This application claims priority of European Patent Office application No. 08012847.3 EP filed Jul. 16, 2008, which is incorporated by reference herein in its entirety.

FIELD OF INVENTION

The present invention relates to a fluidically-controlled valve and to a turbine, in particular a gas turbine, with a bypass in which a valve is present. In addition, the invention relates to a swirler, in particular a gas turbine swirler, with a bleed hole.

BACKGROUND OF INVENTION

Bypasses are, for example, used in gas turbines to bleed compressor air away from the burners of the gas turbine or from the compressor to the turbine section, in particular for active clearance control. To control the air flow from the burners or to the turbine section, respectively, control valves are present in the bypasses. A gas turbine with bypasses used for active clearance control is, for example, disclosed in SE 9801821-1.

Up to now typically servo-controlled valves have been used for controlling the air flow through the bypasses. However, those servo-controlled valves comprise moving parts which require servos and signals to operate. This adds cost and may reduce reliability of the valves.

SUMMARY OF INVENTION

With respect to the mentioned prior art it is a first objective of the present invention to provide an advantageous valve which can, in particular, be used in bypasses of turbines. It is a second objective of the present invention to provide an advantageous turbine including a bypass. A third objective of the present invention is to provide an advantageous combustor with a bleed port.

The first objective is solved by a fluidically-controlled valve as claimed in the claims. The second objective is solved by a gas turbine engine with at least one bypass as claimed in the claims, and the third objective is solved by a combustor as claimed in the claims. The depending claims contain further developments of the invention.

An inventive fluidically-controlled valve comprises a main flow channel with a main flow entrance, a flow exit and a constricted channel section between the main flow entrance and the flow exit. The constricted channel section may, for example, be implemented as a nozzle. The inventive fluidically-controlled valve further comprises a control flow channel having a jet forming control entrance, a first branch channel, a second branch channel, a common channel section, and a convex channel wall. The common channel section follows the control entrance. The first branch channel emerges from the common channel section and leads to the main flow entrance while the second branch channel emerges from the common channel section and leads to the constricted channel section. The convex channel wall extends from the common channel section into the first branch channel.

In the inventive valve the so-called Coandă effect is used for controlling the main flow through the main flow channel. The Coandă effect is the tendency of a jet of a fluid to stay attached to a convex surface rather than following a straight line in its original direction. The Coandă effect can also be shown to be an inviscid phenomenon. This effect is used in the inventive valve for controlling the main flow through the valve by the pressure in the system alone rather than by the position of a movable valve part. If the velocity of the jet forming fluid is below a certain velocity value the fluid follows the convex surface into the first branch channel which leads away from the constricted channel section of the main flow channel. On the other hand, if the velocity of the jet forming fluid exceeds a certain value the jet separates from the convex surface such that it enters the second branch channel and is led to the constricted channel section. If the pressure and velocity of the jet at the constricted channel section is higher than the pressure and velocity of the main flow, the main flow path is restricted and mainly the fluid of the control jet passes through the exit of the main flow path. However, the mass stream of fluid in the control jet can be kept much smaller than the mass stream of the main flow through the main flow channel. Hence, in the "closed" state of the fluidically-controlled valve the mass flow out of the valve is considerably lower than if the valve is "open".

The inventive valve allows the flow through the main flow section to be controlled by the pressure ratios in the valve without the use of a movable valve part. This reduces the number of valve parts and the service intervals since there are no moving parts which need to be regulated or maintained.

The fluidically-controlled valve may further comprise a first flow resistance which is located upstream to the main flow entrance. Additionally, a second flow resistance may be located upstream to the control entrance. Such a second flow resistance would have a flow resistance value which is smaller than the flow resistance value of the first flow resistance. The first flow resistance allows to reduce the pressure of the fluid coming from a fluid reservoir before flowing through the main flow channel with respect to the fluid forming the jet so that the pressure ratio between the main flow and the jet can be suitably set for a proper function of the valve. If the second flow resistance is also present the absolute pressure values can also be set to desired values in addition to the pressure ratio. The second flow resistance advantageously has a smaller flow cross section than the first flow resistance in order to keep the leakage of the fluidically-controlled valve small in the closed state. However, a small control flow as compared to the main flow can also be achieved by other means, e.g. by a conduit of a suitable cross-section leading from the pressure reservoir to the flow restriction.

In order to achieve a high blocking effect for the constricted channel section the second branch channel may be inclined with respect to the main flow channel such that the flow direction of a fluid exiting the second branch channel includes an angle with the flow direction of a fluid flowing through the main flow channel which is larger than 90 degrees. In other words, the jet would have a velocity component the direction of which is opposite to the direction of the main flow, which leads to a higher blocking efficiency. The detailed configuration of the constricted section can also be adapted to increase this effect.

In a special version of the inventive fluidically-controlled valve, a second convex channel wall is formed at the exit of the second branch channel, where the control flow is discharged into the constricted channel region. The second convex channel wall forms the upstream side of the exit with respect to the flow direction of the main flow through the main flow channel. This allows to increase the angle by which the control flow jet enters the constricted channel region.

An inventive gas turbine engine comprises a compressor section, a turbine section and a centre casing located between the compressor section and the turbine section and surrounding a combustor with a combustor exit. The compressor section, the turbine section and the centre casing form a main flow path for a fluid flowing through the gas turbine. The gas turbine engine further comprises at least one bypass connecting the compressor section to the centre casing or to the turbine section for bleeding fluid away from the compressor section to the centre casing, e.g. to the combustor exit, or to the turbine section and/or at least one bypass connecting the centre casing to the turbine section or combustor exit for bleeding fluid away from the centre casing to the turbine section or combustor exit. An inventive fluidically-controlled valve is present in the bypass. The main flow entrance of the valve is connected to the compressor section or the centre casing and the control entrance is connected to the compressor section or the centre casing.

In particular, the at least one bypass may connect the compressor section to the turbine section for altering the flow rate of fluid from the compressor section through the centre casing. In this case the main flow entrance and the control entrance of the fluidically-controlled valve are connected to the compressor section. The main flow entrance may then be connected to a location of the compressor section which is upstream to the location of the compressor section to which the control entrance is connected. By this measure the pressure of the fluid flowing through the valve's main flow path is below the pressure of the jet forming fluid. Alternatively it would be possible to connect the main flow entrance and the control entrance to the same location of the compressor section if a fluidically-controlled valve with at least the first flow resistance, i.e. the flow resistance upstream of the valve's main flow entrance, is present. Note that also a second flow resistance which is located upstream to the jet forming control entrance may be present as well.

In a further implementation of the inventive gas turbine engine the at least one bypass may connect the compressor section or the centre casing to the turbine section for bleeding fluid from the compressor section or the centre casing to the turbine section. The main flow entrance and the control entrance may, in particular, be connected to the compressor section. In this case, the main flow entrance of the fluidically-controlled valve may be connected to a location of the compressor section which is upstream to the location of the compressor section to which the control entrance is connected so that the fluid pressure in the main flow path is below the fluid pressure of the jet forming fluid. Again, alternatively the main flow entrance and the control entrance may be connected to the same location of the compressor section if a flow restriction is used at least upstream of the main flow entrance. However, a second flow restriction upstream to the control entrance may be present, as well. Note that with at least the flow resistance upstream to the main entrance the main entrance and the control entrance may be both connected to the centre casing rather than the compressor section.

As a further alternative, the main flow entrance may be connected to the compressor section and the control entrance may be connected to the centre casing. Since the pressure in the centre casing is higher than the pressure in most parts of the compressor section (except for the compressor exit) the pressure of the jet forming fluid is higher than the pressure of the fluid flowing through the main flow path in this configuration.

According to a first aspect, an inventive combustor comprises at least one swirler vane, a bleed hole present in the swirler vane and a conduit leading a fluid to the bleed hole or away from the bleed hole. An inventive fluidically-controlled valve is present in the conduit. In the inventive swirler, the pressure of the supplying fluid can be used to control whether the flow through the bleed holes is higher or lower. If, for example, the pressure is high in maximum load operation of a gas turbine, with such a swirler, the bleed hole may be closed by the inventive fluidically-controlled valve. On the other hand, if the gas turbine runs on partial load the fluid pressure in the conduit of the bleed hole may fall below a critical pressure so that the fluidically-controlled valve opens and fluid exits the bleed hole or is led away through the bleed hole.

According to a second aspect, an inventive combustor comprises a combustion chamber, a flow channel surrounding the outer wall of the combustion chamber and being in flow communication with the combustion chamber and with a burner plenum. An inventive fluidically-controlled valve is present between the burner plenum and the flow channel. This configuration allows for a decreased air flow into the flame at low pressure in the burner plenum which in turn leads to a hotter flame preventing from lean flame-out.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
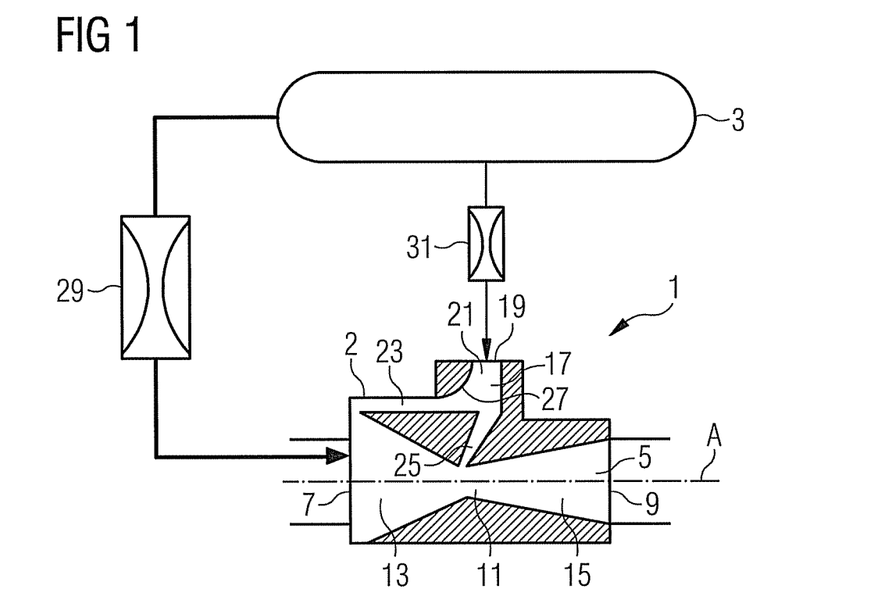
FIG. 1 shows an inventive valve and an option of connecting it to a pressure reservoir.

The inventive valve and its function will be described with reference to FIGS. 1 to 3. FIG. 1 also shows an option of connecting the inventive valve 1 to a pressure reservoir 3.

The valve 1 comprises a valve housing 2, a main flow channel 5 with a main flow entrance 7, a flow exit 9, and a constricted channel region 11. The constricted channel region 11 is formed by an upstream channel section 13 which follows the main flow entrance 7 and shows a reducing cross section, and a downstream flow section 15 which follows the upstream flow section 13 and shows an expanding cross section towards the flow exit 9, so that the main flow channel 5 adopts the form of a venturi nozzle.

The valve 1 further comprises a control flow channel 17 with a fluid jet forming control entrance 19, a common channel section 21 following the control entrance 19, a first branch channel 23 emerging from the common channel section 21 and leading to the main flow entrance 7 of the main flow channel 5, and a second branch channel 25 emerging from the common channel section 21 and leading to the constricted channel region 11 of the main flow channel 5. A convex channel wall 27 extends from the control entrance 19 into the first channel section 23.

Also shown in FIG. 1 is an option as to how to connect the main flow entrance 7 and the control entrance 19 to a common pressure plenum 3. The main flow entrance 7 is connected to the pressure plenum 3 via a first flow resistance 29 while the control entrance 19 is connected to the same pressure plenum 3 via a second flow resistance 31. Compared to the first flow resistance 29 the second flow resistance 31 has a considerably lower flow resistance value and a considerably smaller cross section. This leads to a fluid flow to the control entrance 19 which is considerably higher in pressure and considerably lower in mass flow compared to the fluid flow through the first flow resistance 29 to the main flow entrance 7. By carefully choosing the cross sections and the flow resistance values of the first and second flow resistance the mass flow and the pressure of the fluid fractions flowing through the control flow channel and the main flow channel can be set to desired values within a wide range.

The operation of the valve 1 will now be described with reference to FIGS. 2 and 3. FIG. 2 shows the valve 1 in the fully "open" state while FIG. 3 shows the valve in the "closed" state, i.e. the constricted state.

Actuating the valve is done by fluid pressure in the pressure plenum 3. If the pressure in the pressure plenum 3 is below a certain pressure value the pressure at the main flow entrance 7 will be low due to the flow resistance 29 while the pressure at the control entrance 19 is moderate but in any case higher than the fluid pressure at the main flow entrance 7 due to the smaller flow resistance value of the second flow resistance 31. However, as long as the pressure in the pressure plenum 3 is below a critical pressure value the pressure downstream of the second flow resistance 31 is still low enough so that the jet formed by the jet forming control entrance 19 follows the convex channel wall 27 due to the Coandă Effect. As a consequence, the fluid mass flow through the control channel is directed through the first branch channel 23 towards the main flow entrance 7 of the main flow channel 5. There, the flow through the first branch channel 23 adds to the flow through the main flow channel 5 and leaves the flow exit 9. However, since the cross section of the second flow resistance 31 is considerably lower than the cross section of the first flow resistance 29 the mass flow added to the mass flow entering the valve through the main flow entrance 7 is a small fraction.

If, on the other hand, the pressure in the pressure plenum 3 is above a critical pressure value the pressure at the main flow entrance 7 will be in a medium range while the pressure at the control entrance 19 will be higher maybe even supersonic. Then, the fluid jet formed by the jet forming control entrance 19 separates from the convex channel wall 27 so that it flows into the second branch channel 25 rather than into the first branch channel 23. The control flow is then led by the second branch channel 25 to the constricted channel region 11 where the control flow enters the main flow channel 5 and leaves the main flow channel 5 though the flow exit 9. Since the pressure of the control flow is higher than the pressure of the fluid entering the main flow channel through the main flow entrance 7 the main flow is restrained by the control flow in the constricted area 11 so that only a fraction of the "open" main flow can reach the flow exit 9. Since the mass flow of the control flow is considerably lower than the "open" mass flow of the main flow only a total small mass flow leaves the flow exit 9 so that the valve 1 can be considered as being constricted.

In addition, the blocked main flow supports the separation of the jet from the convex wall section 7 since a fraction of the blocked main flow enters the first branch channel 23 and "blows" the jet away from the convex wall section 27. However, the mass fraction entering the first branch channel 23 is very low so that is does not add substantially to the control flow leaving the flow exit 9. This reinforces the effect of switching and prevents oscillation.

The critical pressure in the pressure plenum 3 at which the valve changes from the open state to the closed state can be set by appropriately choosing the flow resistance values and the cross sections of the first and second flow resistance 29, 31 and by the shape of the nozzle-like main flow channel. Since the main flow channel acts like a venturi nozzle this means that the fluid pressure of the main flow in the constricted area is even more reduced compared to the fluid pressure downstream of the first flow resistance 29. The amount of reduction is thereby determined by the ratio of the cross sections at the main flow entrance 7 and the narrowest point of the constricted channel section 11.

Note that although the main flow entrance 7 and the control entrance 19 are in flow connection with the same pressure reservoir in the present embodiment it is also possible to connect the main flow entrance 7 and the control entrance 19 to different pressure reservoirs, in particular to different pressure reservoirs also having different pressure values. By connecting the control entrance 19 to a pressure reservoir with a higher pressure value than the pressure reservoir to which the main flow entrance 7 is connected the flow resistances 29, 31 can be omitted, at least if the pressure in both reservoirs shows a correlation in pressure variations.

Figure 4:
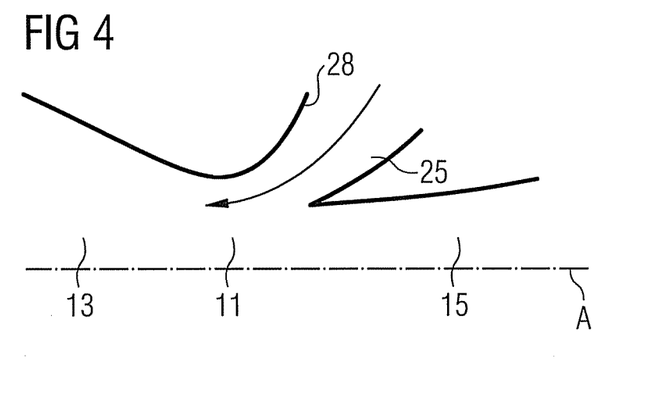
FIG. 4 shows a detail of a special version of the inventive valve.

A detail of a special version of the inventive valve 1 is shown in FIG. 4. In this version, a second convex channel wall (Coandă surface) 28 is formed at the exit of the second branch channel 25, where the control flow is discharged into the constricted channel region 11. The second convex wall 28 forms the upstream side of the exit with respect to the flow direction of the main flow. By this second convex wall 28 it becomes possible to increase the angle by which the control flow jet enters the constricted channel region 11.

Figure 2:
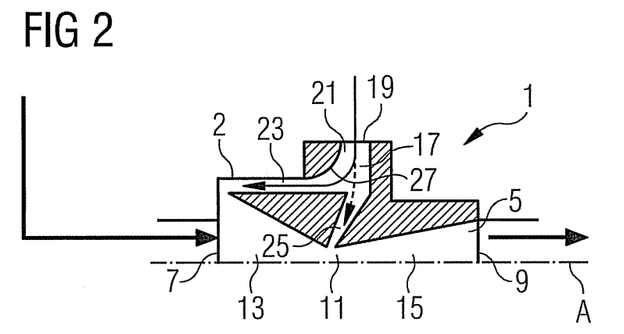
FIG. 2 shows the inventive valve in the "open" state.
Figure 3:
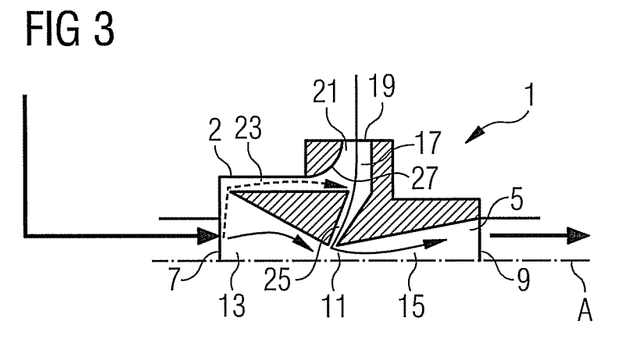
FIG. 3 shows the inventive valve in the "closed" state.
Figure 5:
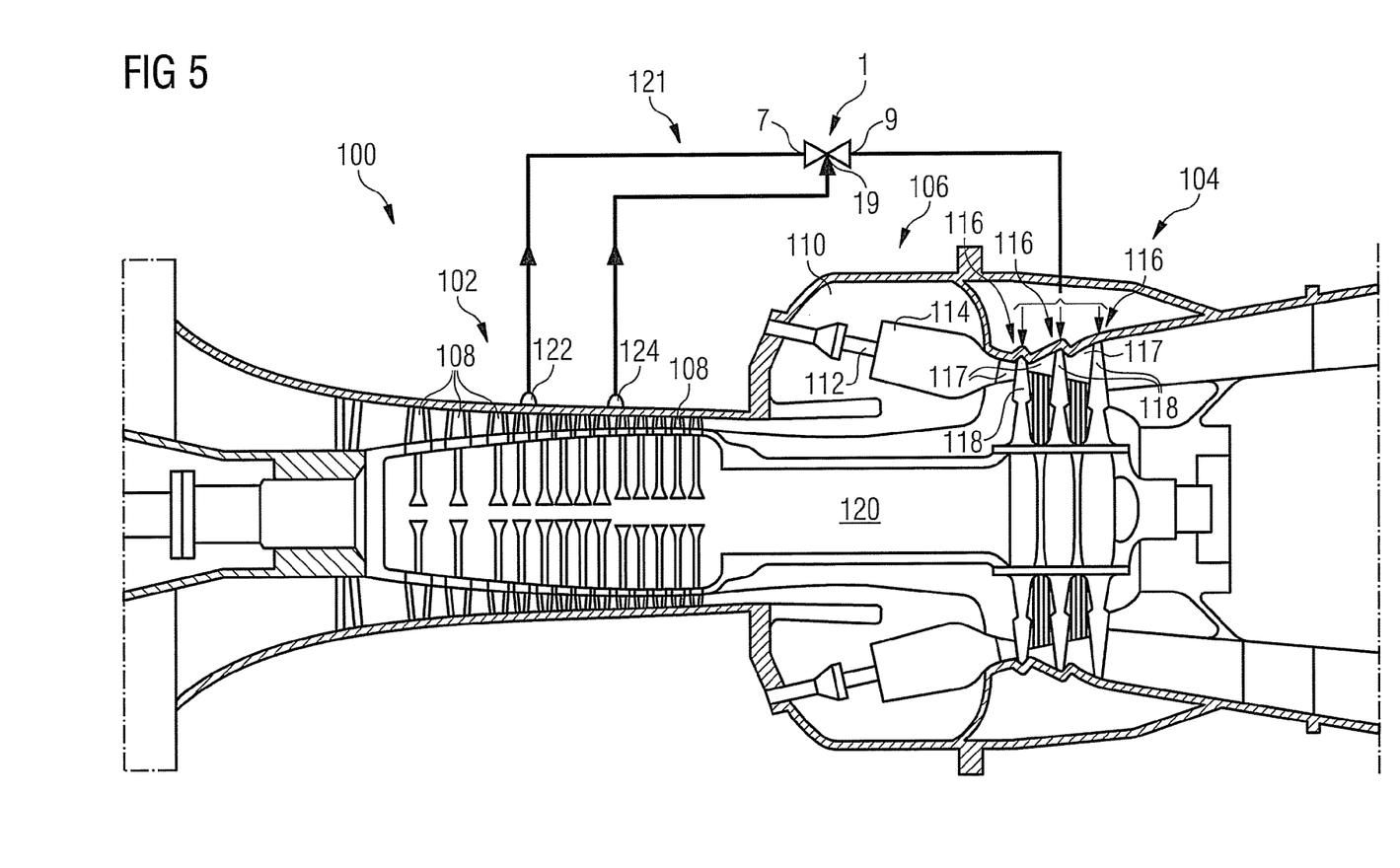
FIG. 5 shows a first embodiment of a gas turbine with a bypass including an inventive valve.

A first embodiment of a gas turbine with a bypass including a valve as described with reference to FIGS. 1 to 3 is shown in FIG. 5.

The exemplary shown gas turbine 100 comprises a compressor section 102, a turbine section 104, and a centre casing 106 which is located between the compressor section 102 and the turbine section 104.

The compressor section 102 comprises a number of compressor stages 108 for compressing air. The compressed air is then led to a burner plenum 110 of the centre casing 106. From the burner plenum 110 the compressed air enters the combustor 114 via the burners 112 of the gas turbine 100 where air is mixed with fuel or introduced in cooling channels. The air-fuel-mixture is then burned in a combustion chamber 114, thereby forming hot combustion gases. The hot combustion gases are led to the turbine section 104 which comprises, in the present embodiment, three turbine stages 116. The turbine stages 116 each comprise a row of turbine vanes 117 which are connected to the casing and a row of turbine blades 118 which are connected to a rotatable rotor shaft 120 that is coupled to a generator or another driven device. The hot and pressurised combustion gases transfer momentum to the turbine blades 118 while expanding and cooling, thereby driving the rotor shaft 120 to rotate.

In operation of such a gas turbine it may be desirable to actively control clearances in the turbine stage. This means that the dimensions of gaps between components of the turbine sections are controlled by suitably heating or cooling the respective components so that they expand or contract.

In the present embodiment active clearance control in the turbine stages 116 is done by compressor air bled from a location of the compressor 102 where a certain pressure level is present by use of a bypass 121. If compressor air shall, e.g., be blown out of components in the turbine section 104 into the combustion flow, for example for forming cooling films over the respective components, the pressure level where the compressor air is bled needs to be higher than the pressure level of the combustion gases at the respective location of the turbine section 104. This means that it may be necessary to have an individual bypass for each turbine stage 116 since different pressure levels of the combustion gases exist at the respective locations. However, the principle of the invention can be explained with a single bypass. Therefore, additional bypasses are not shown in order to keep the figure simple.

In the present embodiment, the compressed air is bled from a location in the upstream section of the compressor 102 and is led to the turbine section 104. In addition, a further airflow is bled from a second location 124 of the compressor section 102 at which the pressure is higher than at the first location 122.

A fluidically-controlled valve 1 is present in the bypass. The main flow entrance 7 of the valve 1 is connected to the first bleed location 122 while the control entrance 19 of the valve 1 is connected to the second bleed location 124 downstream of the first bleed location. The mass flow through the second bleed location 124 to the control entrance 19 of the valve 1 is considerably lower than the mass flow from the bleed location 122 to the main entrance 7 of the valve 1.

The compression work done in the compressor varies with the load and hence changes pressures at the bleed locations 122, 124. This means that the pressure level at the first and second bleed locations 122, 124 is higher the higher the load of the gas turbine is. When the turbine section shall, e.g., be warmed for clearance control at part load the pressure at the second bleed location 124 is below the critical pressure for the valve 1 so that the valve 1 is open and the warm compressor air from the first bleed location 122 can be used to warm the turbine section 104. On the other hand, when a certain load level of the gas turbine is reached, a warming of the turbine section 104 is not necessary anymore. The second bleed location 124 is chosen such that the pressure at this bleed location exceeds the critical pressure when the load level is high enough so that no warming is necessary anymore. At this point the constricted flow through the valve acts as purging or cooling air in the turbine 104.

Figure 6:
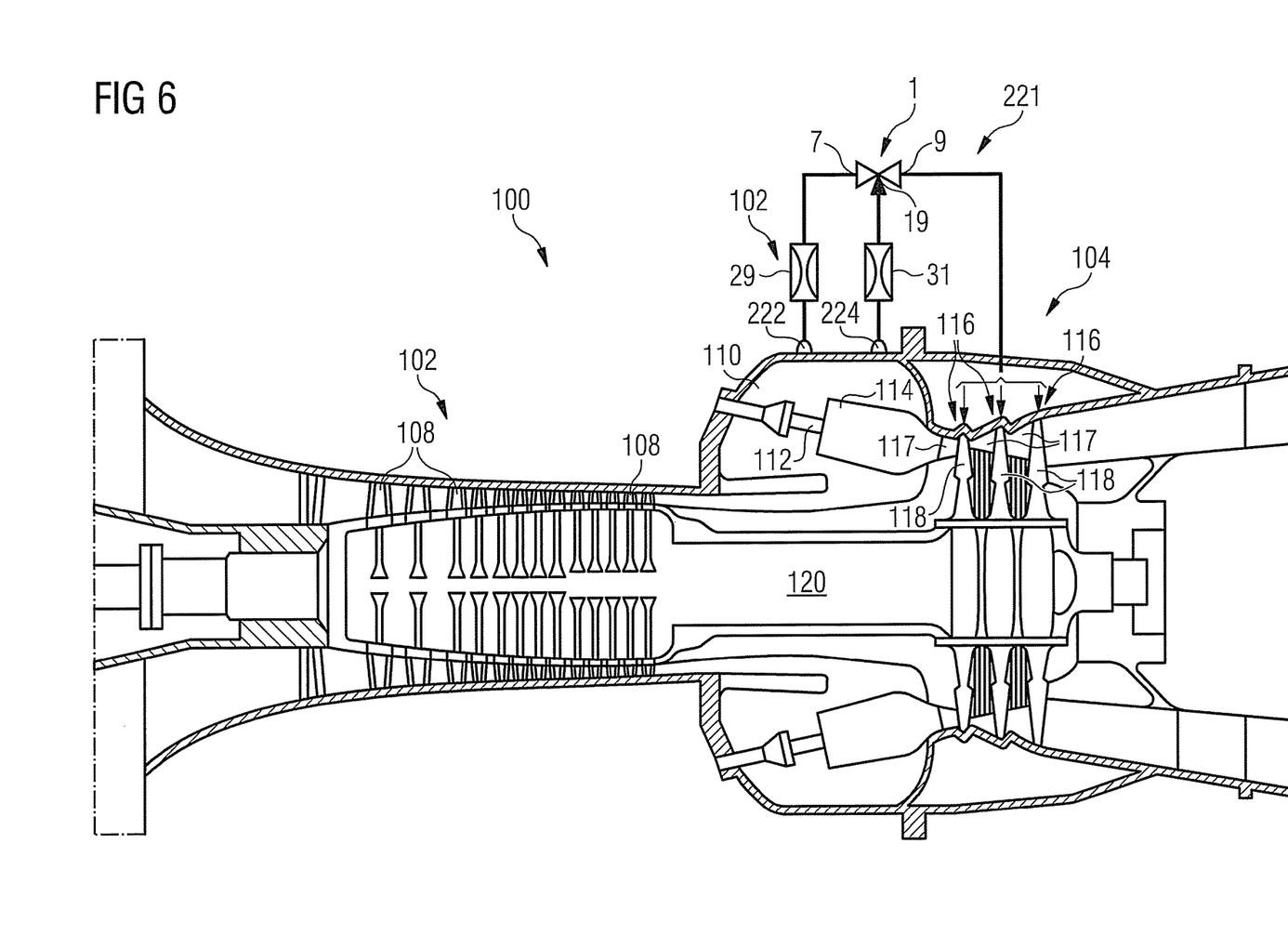
FIG. 6 shows a second embodiment of a gas turbine with a bypass including an inventive valve.

A second embodiment of the gas turbine with a bypass is shown in FIG. 6. The second embodiment differs from the first embodiment only in the bypass. Therefore, the gas turbine itself is not described again in order to avoid repetitions. Elements of FIG. 6 corresponding to elements of FIG. 5 are marked with the same reference numerals as in FIG. 5.

The bleed locations 222, 224 are both at the burner plenum 110. This means that both bleed locations 222, 224 are at the same pressure level. While the first bleed location 222 is connected to the main flow entrance 7 of the valve 1 in the bypass 221, the second bleed location 224 is connected to the control entrance 19. A first flow resistance 29 is connected between the first bleed location 222 and the main flow entrance 7, and a second flow resistance 31 is connected between the second bleed location 224 and the control entrance 19. The second flow resistance 31 has a smaller flow resistance value and a smaller cross section than the first flow resistance 29. When the gas turbine load increases, the pressure in the burner plenum 110 rises and exceeds eventually the critical pressure level which is set by the flow resistance 29 and the flow resistance 31 so that the valve 1 constricts once the critical pressure level is reached. In other aspects the second embodiment does not differ from the first embodiment shown in FIG. 5. This has two effects. Firstly, whilst accelerating, the compressor bleed is higher giving additional surge margin. Secondly, whilst accelerating (and warming up), the combustor has a richer mixture and thus more margin against lean flame-out.

Figure 7:
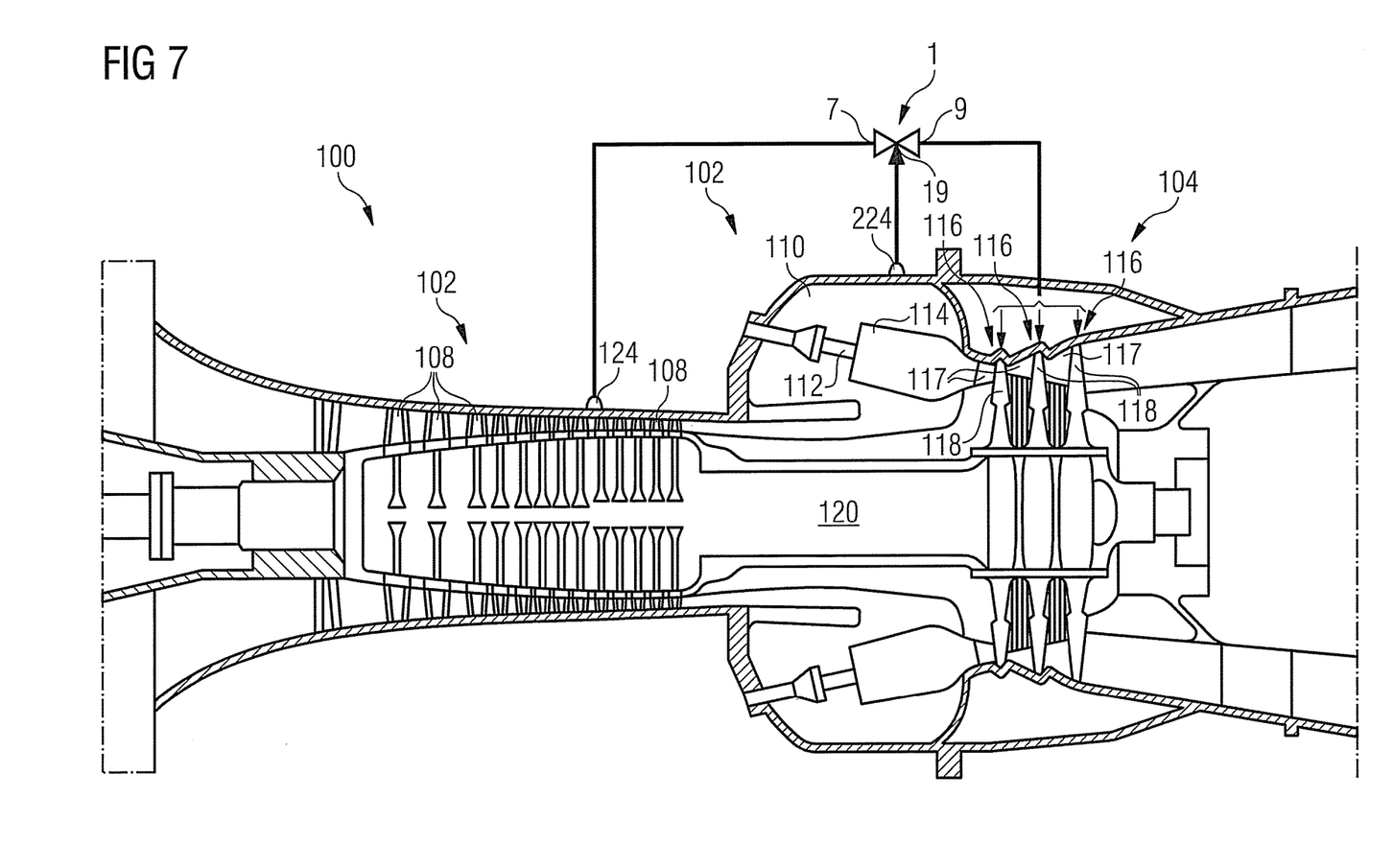
FIG. 7 shows a second embodiment of a gas turbine with a bypass including an inventive valve.

A third embodiment of the gas turbine with a bypass is shown in FIG. 7. The third embodiment differs from the first and second embodiments only in the bypass. Therefore, the gas turbine itself is not described again in order to avoid repetitions. Elements of FIG. 7 corresponding to elements of FIG. 5 or FIG. 6 are marked with the same reference numerals as in FIG. 5 and FIG. 6, respectively.

In the present embodiment, the main flow entrance 7 of the valve 1 is connected to a bleed location 124 in the compressor section 102, like in the first embodiment, while the control entrance 19 of the valve 1 is connected to a bleed location 224 in the burner plenum 110, like in the second embodiment. As the pressure at the bleed location 224 in the burner plenum 110 is higher than the pressure at the bleed location 124 in the compressor section 102 the first and second flow resistance present in the second embodiment (FIG. 6) are not needed in the third embodiment shown in FIG. 7.

Figure 8:
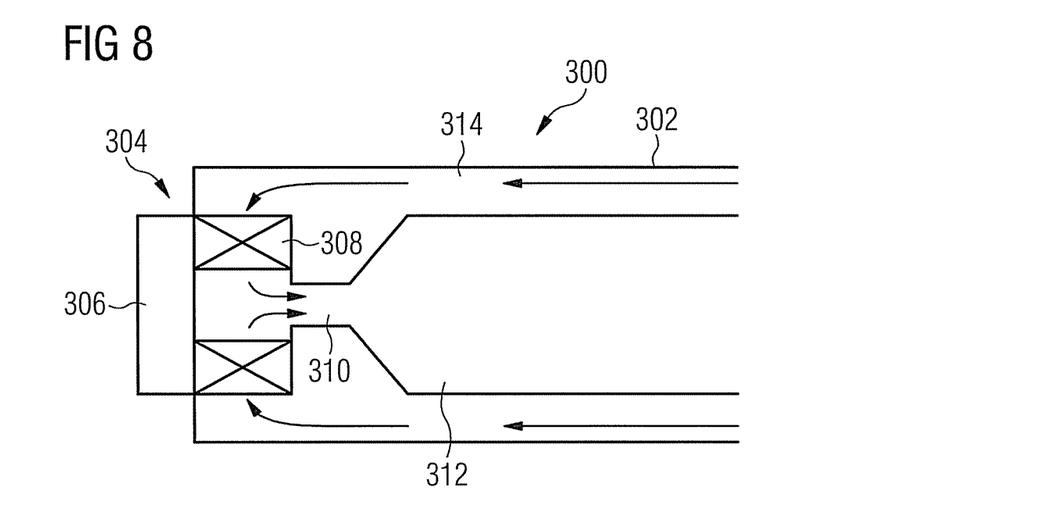
FIG. 8 schematically shows a gas turbine burner including a combustor.

FIG. 8 shows a combustor of a gas turbine as it is shown in FIGS. 5 to 7.

In FIG. 8, the combustor 300 comprises an outer combustor wall and, in flow series, a burner 304 comprising a head plate 306 and a swirler 308, a prechamber 310, and a main combustion chamber 312. Note that the prechamber 310 may either be an individual part connected to the burner 304 and to the main combustion chamber 312, an integral extension of the burner 304 towards the main combustion chamber 312, or an integral extension of the main combustion chamber 312 towards the burner 304.

The swirler 308, the prechamber 310, and the main combustion chamber are surrounded by an outer combustor wall 302. A flow channel 314 for guiding combustion air into the swirler 308 is formed between the outer combustor wall 302 on the one side and the main combustion chamber 312, the prechamber 310 and the swirler 308 on the other side. Combustion air is led through this flow channel 314 into the swirler 308 where it is mixed with fuel and burnt after leaving the swirler 308. The hot and pressurised combustion gases then leave the burner through the prechamber 310 to the main combustion chamber 312 which is connected to the turbine entrance (not shown in FIG. 8).

Figure 9:
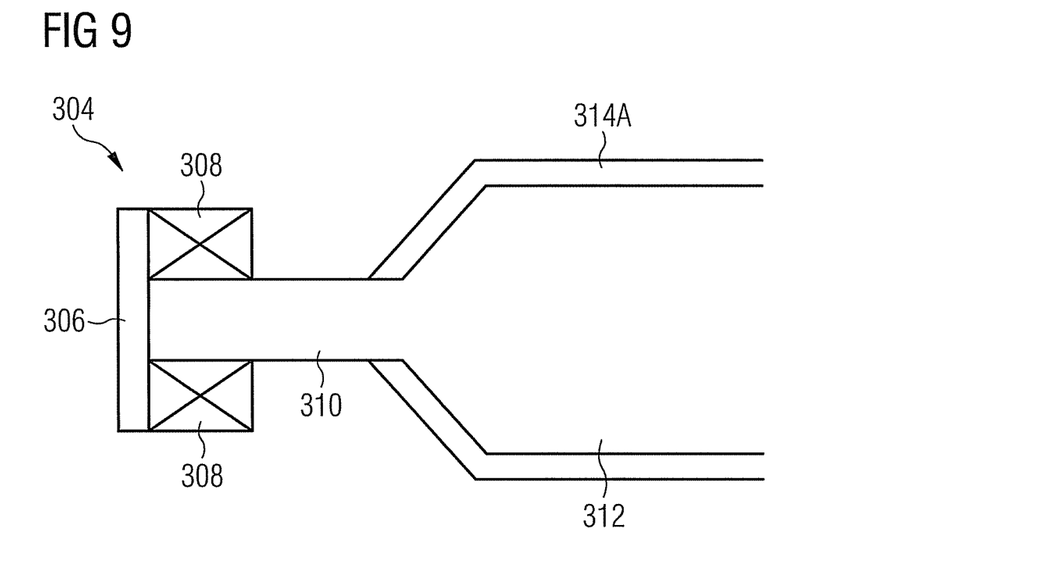
FIG. 9 schematically shows a gas turbine burner including an alternative combustor.

FIG. 9 shows an alternative design for the combustor of FIG. 8. The difference of the combustor shown in FIG. 10 lies in the configuration of the flow channel 314A which differs from the flow channel of the combustor shown in FIG. 7. The flow channel in the combustor shown in FIG. 9 does not lead to the swirler 308 but to the prechamber 310. Combustion cooling air is led through this flow channel 314 into the prechamber 310 and/or the main combustion chamber 312 where it mixes with the flame comprised of the air and the fuel flowing through the swirler 308.

The main fuel which is mixed with combustion air is introduced into the airflow through the swirler 308 by fuel nozzles located in the head plate 306. In addition, bleed holes 318 are present in the swirler vanes 316 of the swirler 308 for bleeding additional air and/or additional fuel into the swirler. By bleeding additional air and/or fuel into the swirler (see FIG. 10) the distribution of the fuel-air-mixture in the swirler can be optimised.

If, for example, air is bled to a bleed hole 318 the bleed hole may be in flow connection with the burner plenum 110 via a bypass 321 in form of a conduit as shown in FIG. 8. The air which is let to the bleed hole 318 is bled from the burner plenum 110, which is only schematically shown in the figure, at a first bleed location 327. This bleed location 327 is connected to the main flow entrance 7 of a fluidically-controlled valve 1 which is present in the bypass. The flow exit 9 of the valve 1 is then connected to the bleed hole 318. Furthermore, a second bleed location 324 is present in the burner plenum 110 and connected to the flow entrance 19 of the valve 1.

A first flow resistance 29 is located between the first bleed location 322 and the main flow entrance 7 of the valve 1. A second flow resistance 31 is located between the second bleed location 324 and the control entrance 19 of the valve 1. The flow resistance value and the cross section of the second flow resistance 31 are considerably smaller than the flow resistance value and the cross section of the first flow resistance 29. By suitably choosing the flow resistance values the critical pressure, which to be present in the burner plenum 110 for closing the valve can be set appropriately so that additional air is bled to the bleed hole 318 at partial load of the gas turbine while little additional air is bled to the bleed hole 318 once a certain load level is reached or exceeded.

As has been already mentioned with respect to FIGS. 5 to 7, the compression work of the compressor 102 rises with increasing load of the gas turbine. This means that the pressure level in the burner plenum 110 also rises with the load of the gas turbine so that the pressure level can reach the critical level at a defined load level of the gas turbine.

Figure 10:
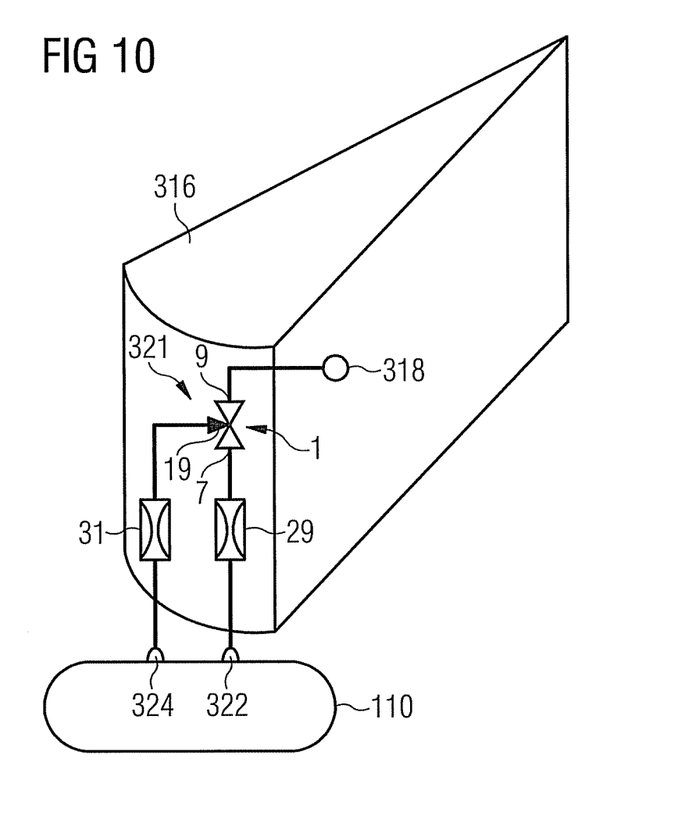
FIG. 10 shows a swirler vane with a bleed hole and an inventive valve.

However, the bleed holes 318 in the swirler can also be used to bleed air away from the air passages between the swirler vanes 316 in order to alter the fuel air mixing pattern improving the stability performance of the burner at lower load due to a reduction of turbulent flows. In this case, the bleed hole 318 is preferably located in the top wall of the swirler rather than in the swirler vane 316. In difference to what is shown in FIG. 10 the bleed hole would then be connected to the main flow entrance 7 of the valve 1 rather than to the flow exit 9. In other words, the pressure plenum to which the main flow entrance 7 of the valve 1 is connected would be the air passages between the swirler vanes 316 rather than the burner plenum 110. The pressure plenum to which the control entrance 19 is connected could be the burner plenum 110 as it is depicted in FIG. 10. On the other hand, if a suitable restrictor is used acting on the flow between the bleed hole and the main flow entrance 7 the control entrance 19 could also be connected to the air passage between the swirler vanes 316 instead of being connected the burner plenum 110. The flow exit 9 of the valve 1 is connected to a lower pressure downstream of the combustion system.

Figure 11:
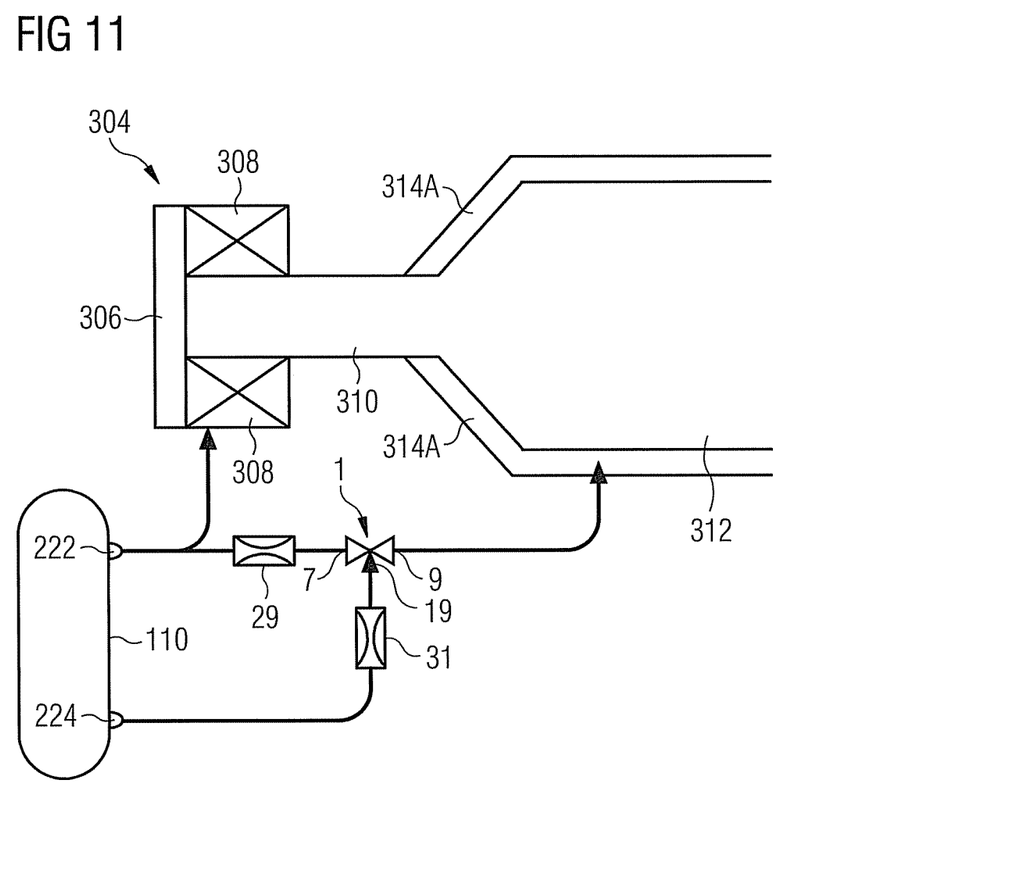
FIG. 11 schematically shows a gas turbine burner including a further alternative combustor.

A gas turbine burner including a further alternative combustor is shown in FIG. 11. This combustor comprises a flow channel 314A as it has been described with respect to the combustor shown in FIG. 9 and a swirler 308. An inventive valve 1 is present between the burner plenum 110 and the flow channel 314A where the main flow entrance 7 of the valve 1 is connected to the burner plenum 110 via a first flow resistance 29 while the control entrance 19 is connected to the burner plenum 110 via a second flow resistance 31, as it is shown in FIG. 6. The flow exit of the valve is connected to the flow channel 314A. In addition, the swirler 308 is in flow connection with the burner plenum 110 without interposed inventive valve. In this configuration, at low pressure in the burner plenum 110 more flow is led to the flow channel 314A than at high pressure in the burner plenum 110. The increased flow to the flow channel 314A leads to an increase in air introduced into the flame which in turn leads to a hotter flame preventing from lean flame-out.

Note, that although specific bleed locations and routes have been described in the embodiments, these bleed locations and routs are not mandatory. For example, the bleed location 124 in FIG. 5 could as well be located at the compressor exit or the burner plenum where the pressure of the compressed air is the highest. Likewise, the bypass shown in FIG. 10 does not need to lead from the burner plenum to the bleed hole in the swirler vane, but may, in principle, lead from the compressor section to the swirler vane or to the turbine although this would mean a considerable complexity in construction and thus a considerable engineering effort. Suitable bleed routs extend from the compressor section 102 to the combustor exit and/or the turbine section as well as from the burner plenum to the combustor exit and/or the turbine section.

The fluidically-controlled valves shown in the embodiments of the invention reduce the number of movable parts in the bypasses and hence the inspection effort necessary for the bypasses. It also avoids wear and tear.

Reference Numerals
1 valve
2 valve housing
3 pressure plenum
5 main flow channel
7 main flow entrance
9 flow exit
11 constricted channel region
13 tapering channel region
15 expending channel region
17 control flow channel
19 control entrance
21 common channel section
23 first branch channel
25 second branch channel
27 convex channel wall
28 second convex channel wall
29 first flow resistance
31 second flow resistance
100 gas turbine
102 compressor section
104 turbine section
106 centre casing
108 compressor stage
110 burner plenum
112 burner
114 combustion chamber
116 turbine stage
118 turbine blade
120 rotor shaft
121 bypass
122 bleed location
124 bleed location
221 bypass
222 bleed location
224 bleed location
300 combustor
302 outer combustor wall
304 burner
306 head plate
308 swirler
310 pre-chamber
312 main combustion chamber
314 flow channel 316 swirler vane
318 bleed hole
321 bypass
322 bleed location
324 bleed location

The invention claimed is:

1. A combustor, comprising:
a swirler vane of the combustor;
a bleed hole located in the swirler vane; and
a conduit leading a fluid to the bleed hole or away from the bleed hole, wherein a fluidically-controlled valve is located in the conduit,
wherein the fluidically-controlled valve includes a main flow channel including a main flow entrance, a flow exit, and a constricted channel section located between the main flow entrance and the flow exit; and
a control flow channel including a jet-forming control entrance, a first branch channel, a second branch channel, a common channel section, and a first convex channel wall,
wherein the common channel section follows the control entrance, the first branch channel emerges from the common channel section and leads to the main flow entrance, the second branch channel emerges from the common channel section and leads to the constricted channel section, and
wherein the first convex channel wall extends from the common channel section into the first branch channel.

2. The combustor as claimed in claim 1, wherein the fluidically-controlled valve further comprises a first flow resistance located upstream to the main flow entrance.

3. The combustor as claimed in claim 2,
wherein the fluidically-controlled valve further comprises a second flow resistance located upstream to the control entrance and including a second flow resistance value and wherein a second flow resistance value is smaller than a first flow resistance value of the first flow resistance.

4. The combustor as claimed in claim 3,
wherein the second flow resistance has a smaller second flow cross section than a first flow cross section of the first flow resistance.

5. The combustor as claimed in claim 1,
wherein the second branch channel is inclined with respect to the main flow channel whereby a second flow direction of a fluid exiting the second branch channel includes an angle with a first flow direction of a fluid flowing through the main flow channel that is greater than 90°.

6. The combustor as claimed in claim 1,
wherein a second convex channel wall is formed at an exit of the second branch channel where a control flow is discharged into the constricted channel region, and
wherein the second convex channel wall forms an upstream side of the exit with respect to the first flow direction of a main flow through the main flow channel.

7. A gas turbine engine, comprising
a compressor section;
a turbine section;
a centre casing, located between the compressor section and the turbine section and surrounding a combustor with a combustor exit;
a bypass connecting a first section to a second section; and
a fluidically-controlled valve located in the bypass where a main flow entrance is connected to the compressor section or the centre casing, and
a control entrance is connected to the compressor section or the centre casing, and wherein the bypass bleeds fluid from the first section to the second section, wherein the compressor section, the turbine section, and the centre casing form a main flow path for a fluid flowing through the turbine, and
wherein the fluidically controlled valve includes a main flow channel including a main flow entrance, a flow exit, and a constricted channel section located between the main flow entrance and the flow exit; and
a control flow channel including a jet-forming control entrance, a first branch channel, a second branch channel, a common channel section, and a first convex channel wall,
wherein the common channel section follows the control entrance, the first branch channel emerges from the common channel section and leads to the main flow entrance, the second branch channel emerges from the common channel section and leads to the constricted channel section, and
wherein the first convex channel wall extends from the common channel section into the first branch channel.

8. The gas turbine as claimed in claim 7,
wherein the fluidically-controlled valve further comprises a first flow resistance located upstream to the main flow entrance and a second flow resistance located upstream to the control flow entrance, and
wherein the second flow resistance has a smaller flow resistance value and a smaller flow cross section than that of the first flow resistance.

9. The gas turbine engine as claimed in claim 8,
wherein the first section is the compressor section and the second section is the centre casing, and
wherein the main flow entrance and the control entrance of the fluidically-controlled valve are connected to the compressor section.

10. The gas turbine engine as claimed in claim 9, wherein the main flow entrance is connected to a first location of the first section which is upstream to a second location of the first section to which the control entrance is connected.

11. The gas turbine engine as claimed in claim 9, wherein the main flow entrance and the control entrance are connected to a same location of the first section.

12. The gas turbine engine as claimed in claim 8, wherein the first section is the compressor section or the centre casing and the second section is the turbine section.

13. The gas turbine engine as claimed in claim 12, wherein the main flow entrance and the control entrance of the fluidically-controlled valve are connected to the compressor section.

14. The gas turbine engine as claimed in claim 13, wherein the main flow entrance is connected to a third location of the compressor section which is upstream to a fourth location of the compressor section to which the control entrance is connected.

15. The gas turbine engine as claimed in claim 13, wherein the main flow entrance and the control entrance are connected to the same location of the compressor section.

16. The gas turbine engine as claimed in claim 12, wherein the main flow entrance and the control entrance of the fluidically-controlled valve are connected to the centre casing.

17. The gas turbine as claimed in claim 12, wherein the main flow entrance is connected to the compressor section and the control entrance is connected to the centre casing.

* * * * *